US011228494B2

(12) United States Patent
Kamath et al.

(10) Patent No.: US 11,228,494 B2
(45) Date of Patent: Jan. 18, 2022

(54) SHARING POLICY AND CONFIGURATION INFORMATION RELATED TO A CONFIGURATION ITEM

(71) Applicant: HEWLETT PACKARD ENTERPRISE DEVELOPMENT LP, Houston, TX (US)

(72) Inventors: Harish B Kamath, Bangalore (IN); Sudhir Senguttuvan, Bangalore (IN); Supreeth Shadakshara Deva, Bangalore (IN); Gaurav Kumar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 209 days.

(21) Appl. No.: 15/842,819

(22) Filed: Dec. 14, 2017

(65) Prior Publication Data

US 2018/0219740 A1 Aug. 2, 2018

(30) Foreign Application Priority Data

Jan. 31, 2017 (IN) .............................. 201741003604

(51) Int. Cl.
*H04L 12/24* (2006.01)
(52) U.S. Cl.
CPC ...... *H04L 41/0893* (2013.01); *H04L 41/0806* (2013.01); *H04L 41/0853* (2013.01); *H04L 41/0846* (2013.01)
(58) Field of Classification Search
CPC ..... H04L 63/20; H04L 63/02; H04L 63/0263; H04L 41/5009; H04L 41/5058;
(Continued)

(56) References Cited

U.S. PATENT DOCUMENTS 7,003,562 B2 * 2/2006 Mayer ................ H04L 41/0893
703/21
8,040,822 B2 * 10/2011 Proulx ............... H04L 41/0806
370/254
(Continued)

FOREIGN PATENT DOCUMENTS

CN 101861584 A 10/2010
WO 2008/021514 A2 2/2008
WO WO-2016048390 A1 * 3/2016 ........... H04B 1/0003

OTHER PUBLICATIONS

Cisco, "Integrating the Cisco ASA with Cisco Nexus 9000 Series Switches and the Cisco Application Centric Infrastructure," Dec. 22, 2014, pp. 1-25 [online], Retrieved from the Internet on Dec. 16, 2016 at URL: <cisco.com/c/en/us/solutions/collateral/data-center-virtualization/application-centric-infrastructure/whitepaper_C11-733540_html>.
(Continued)

*Primary Examiner* — Kevin T Bates
*Assistant Examiner* — Ranjan Pant
(74) *Attorney, Agent, or Firm* — Trop, Primer & Hu, P.C.

(57) ABSTRACT

Examples disclosed herein relate to sharing policy and configuration information related to a configuration item (CI). In an example, a configuration item coupled to a network fabric that is managed via a first management platform may be identified. The configuration item may be managed via a second management platform. A policy associated with the CI may be determined from the second management platform. Configuration information related to the policy may be determined from the second management platform. The policy and the configuration information related to the policy may be stored. The policy and the configuration information related to the policy may be shared with first management platform, wherein the policy and the configuration information related to the policy may
(Continued)

be useable to define configuration information for a configuration item managed via first management platform.

16 Claims, 4 Drawing Sheets

(58) Field of Classification Search
CPC ....... H04L 45/38; H04L 9/321; H04L 41/046; H04L 63/101; H04L 41/0213; H04L 41/0893; H04L 12/66; H04L 41/08; H04L 41/0806; H04L 41/5003; H04L 49/25; H04L 69/40; H04L 41/0853; H04L 41/0846; H04L 41/0803
See application file for complete search history.

(56) References Cited

U.S. PATENT DOCUMENTS

| | | | | |
|---|---|---|---|---|
| 2008/0133729 | A1* | 6/2008 | Fridman | H04L 41/0893 709/223 |
| 2015/0207724 | A1* | 7/2015 | Choudhury | H04L 45/42 370/255 |
| 2015/0370665 | A1* | 12/2015 | Cannata | G06F 3/0685 714/4.11 |
| 2016/0028608 | A1 | 1/2016 | Dasgupta et al. | |
| 2016/0112270 | A1* | 4/2016 | Danait | H04L 41/142 709/220 |
| 2016/0127454 | A1* | 5/2016 | Maheshwari | H04L 41/00 709/223 |
| 2016/0182296 | A1* | 6/2016 | Sharp-Paul | H04L 41/0813 709/224 |
| 2016/0337896 | A1* | 11/2016 | Rajagopalan | H04L 41/0893 |
| 2017/0005951 | A1* | 1/2017 | Labonte | H04L 49/3045 |

OTHER PUBLICATIONS

Citrix, "Implementing Cisco Application Centric Infrastructure with Citrix Netscaler Application Delivery Controllers," Jan. 28, 2015, pp. 1-37.
F5 Networks, Inc., "Optimize Application Deployment with Cisco and F5," 2016, pp. 1-3.
World Wide Technology, Inc., "Stretched Active-Active Application Centric Infrastructure (ACI) Fabric," White Paper, May 12, 2015, pp. 1-12.

* cited by examiner

SHARING POLICY AND CONFIGURATION INFORMATION RELATED TO A CONFIGURATION ITEM

BACKGROUND

A data center may centralize and consolidate Information Technology (IT) resources thereby enabling organizations to conduct business round-the-clock. A data center infrastructure may include a collection of heterogeneous resources (for example, storage devices, network components, etc.).

BRIEF DESCRIPTION OF THE DRAWINGS

For a better understanding of the solution, embodiments will now be described, purely by way of example, with reference to the accompanying drawings, in which.

DETAILED DESCRIPTION

A typical data center infrastructure may include a variety of components (hardware and/or software). These components may include, for example, servers, networking equipment (for example, routers and switches), storage, and security (for example, firewall). Further, there are a variety of new computing options such as cloud systems and virtual servers. Such advancements have helped organizations quickly scale-up their existing IT infrastructures according to their requirements. However, it has also made the task of IT personnel who manage configuration items (for example, network ports) in those infrastructures more difficult especially in a scenario where a configuration item (CI) or a set of CIs may be managed via different management platforms. For example, network configurations for a group of blade servers and a set of virtual servers may be managed (for example, configured) via separate management platforms. Thus, apart from the complexity in having the knowhow related to the configuration items, it may be challenging, with a potential for human error, to configure these CIs in a manner that not only enables communication between them but also provides an end-to-end connectivity across a data center infrastructure. This could be further challenging in a scenario where the CIs may be governed via different policies. Referring to the earlier example, there may be a scenario where different firewall policies may be applicable to blade servers and virtual servers.

To address these technical challenges, the present disclosure describes various examples for sharing policy and configuration information related to a configuration item. In an example, a configuration item coupled to a network fabric that is managed via a first management platform may be identified. The configuration item may be managed via a second management platform. A policy associated with the CI may be determined from the second management platform. Further to the determination, configuration information related to the policy may be determined from the second management platform. The policy and the configuration information related to the policy may be shared with first management platform, and used to define configuration information for a configuration item managed via first management platform.

Figure 1:
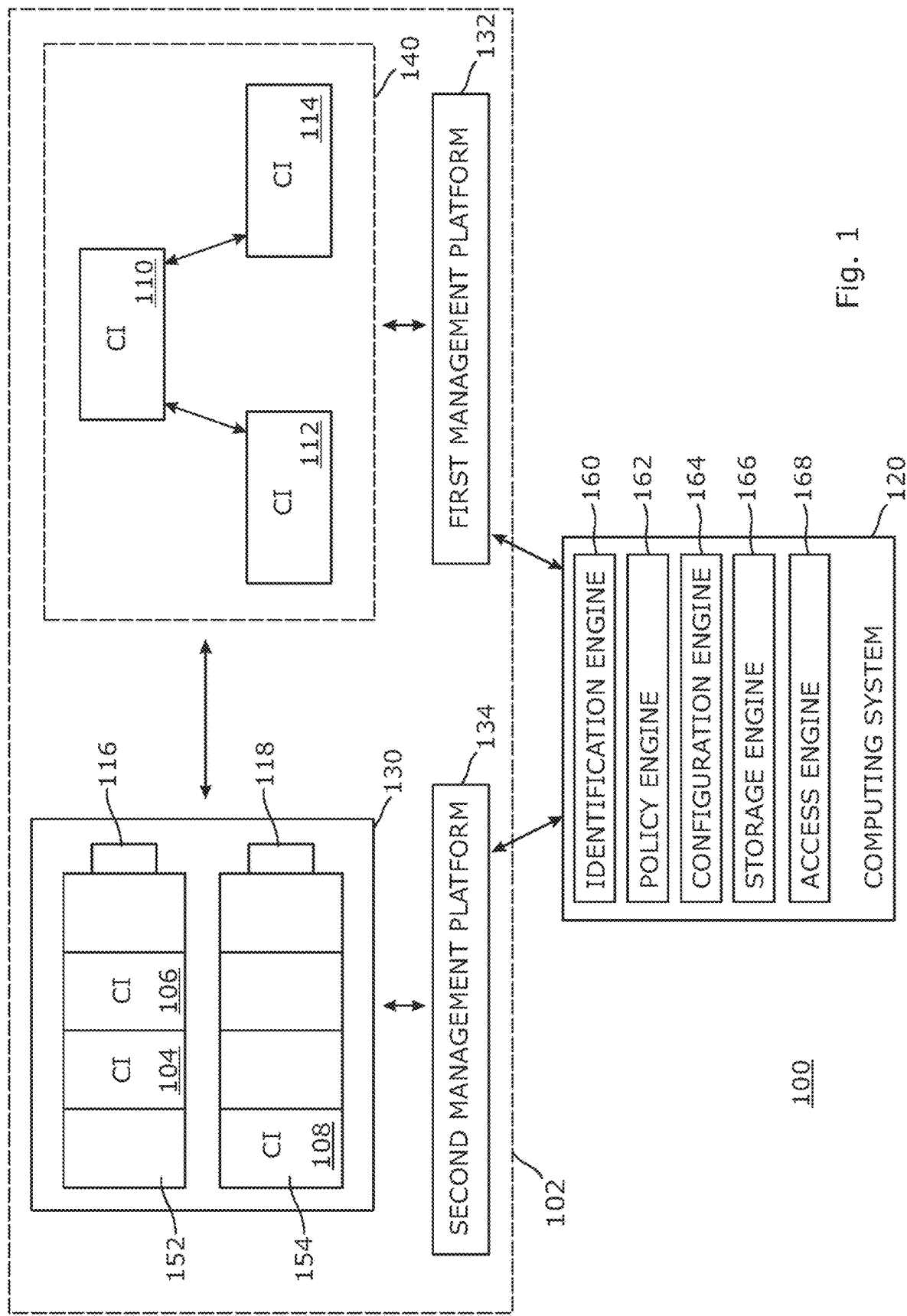
FIG. 1 is a block diagram of an example computing environment for sharing policy and configuration information related to a configuration item (CI)

FIG. 1 is a block diagram of an example computing environment 100 for sharing policy and configuration information related to a configuration item. In an example, computing environment 100 may include an information technology infrastructure (IT) 102 and a computing system 120. The IT infrastructure 102 may include a plurality of configurations items 104, 106, 108, 110, 112, 114, 116, and 118, a first management platform 132, and a second management platform 134. Although eight configuration items are shown as part of the IT infrastructure 102 in FIG. 1, other examples of this disclosure may include more or less than eight configuration items.

A configuration item (for example, 104) may include an IT resource or a combination of IT resources that may depend on and/or have relationships with other IT processes. A configuration item (for example, 104) may be a component of an IT infrastructure (for example, 102) or an item associated with an infrastructure. Example types of a configuration item (for example, 104) may include hardware and/or software. Examples of hardware CIs may include, for example, servers, computer systems, routers, switches, and monitors. A CI (for example, 104) may be a physical entity, a logical entity, or a conceptual entity.

In an example, IT infrastructure 102 may represent a cloud system. The cloud system may be a private cloud, a public cloud, or a hybrid cloud. The cloud system may be used to provide or deploy various types of cloud services. These may include Infrastructure as a Service (IaaS), Platform as a Service (PaaS), Software as a Service (SaaS), and so forth. Thus, in an example, components of the information technology infrastructure 102 may represent various types of cloud-based resources. These resources may be hardware resources, software resources, or any combinations thereof. The hardware resources may include, for example, computer systems, computer servers, workstations, printers, scanners, and storage devices. The software resources may include, for example, operating system software (machine executable instructions), firmware, and/or application software. In another example, the information technology infrastructure 102 may represent a data center.

In an example, configuration items 104, 106, and 108 may each include a server computer (for example, a blade server), and configuration items 110, 112, and 114 may each include a network device. In an example, configuration items 110, 112, and 114 (collectively referred to as a "network fabric" 140) may be managed by first management platform 132, and configuration items 104, 106, 108, 116, and 118 may be managed by second management platform 134. As used herein, the term "management platform" may refer to hardware and/or software that may be used to manage (for example, provisioning, configuration, etc.) a configuration item (for example, 116). In an example, the second management platform may store a policy (or policies) that may be defined and/or associated with a configuration item(s). Examples of a policy may include a network policy (for example, a link aggregation policy), a security policy (for example, a firewall policy), data policy, an access control policy, a configuration policy, and a user policy.

As used herein, a "network device" may refer to any type of networking device that may be capable of routing packets.

In examples, a network device may include a network switching device, such as a network switch, a network router, a virtual switch, or a virtual router.

In an example, configuration items 110, 112, and 114 may represent a network fabric 140. As used herein, the term "network fabric" may refer to a network topology in which components may exchange data with each other through interconnecting network devices. In an example, network fabric 140 may represent a wireless or wired network. Network fabric may include, for example, a Local Area Network (LAN), a Wireless Local Area Network (WAN), a Metropolitan Area Network (MAN), a Storage Area Network (SAN), a Campus Area Network (CAN), or the like.

In an example, network fabric 140 may represent a software defined network (SDN), which is based on a network architecture that decouples the control plane from the data plane. The control plane may be implemented in an SDN controller (for example, 132) and the data plane may be implemented in the networking infrastructure (for example, 110, 112, and 114). The SDN controller may be aware of all the devices and their points of interconnection in a SDN network and may perform various functions such as routing, policy implementation, receiving unknown flow packets, path resolution, flow programming, etc. Each new or missed flow through the network may be routed via the controller that decides the network path for a flow and adds an entry for that flow in a flow table, in each of the network devices along the path. A SDN enabled device may consult a flow table(s) for forwarding packets in the data plane.

In another example, network fabric 140 may represent an Application Centric Infrastructure (ACI) which follows an automated application-driven policy model that allows an organization to define a policy, and the infrastructure automates the implementation of the policy in the hardware components. In an example, the ACI may include spine and leaf switches (for example, 112 and 114), and a ACI controller (for example, 132). Every leaf switch may be connected to the spines in a mesh fashion. The packet forwarding may be handled by the switches. ACI may use a policy model that allows packets to flow between applications only if they've been allowed access. Before a packet is forwarded, it's identified and the policy associated with it is enforced on the switch. The ACI controller may act as a central repository for all policies. The ACI controller may manage and configure policies on each of the switches in the ACI fabric.

In an example, servers (for example, blade servers) 104, 106, and 108 may be arranged in a rack 130 comprising one or multiple enclosures 152 and 154. Each enclosure may accommodate one or a plurality of servers. In an example, each enclosure may include or be coupled to one or multiple virtual connect devices (for example, 116 and 118). As used herein, the term "coupled" may refer to connected, directly or indirectly, by a communication path. In some example, each virtual connect device may include an Ethernet engine or a Fibre Channel engine. Each virtual connect device may include one or multiple ports for connection to an external network, for example, network fabric 140.

A virtual connect device (for example, 116) may virtualize servers (for example, blade servers) 104, 106, and 108 which may be arranged in rack 130. A virtual connect device (for example, 116) may add an abstraction layer between the edge of a server (for example, 106) and the edge of a network fabric (for example, 140). As a result, the external networks connect to a shared resource pool of MAC addresses and WWNs, rather than to MACs/WWNs of individual servers. Using the concept of a "server profile," a virtual connect device links information assigned to a specific server bay to the server hardware and its network connections. A server profile may be used to manage a server's internal identity (server serial number, UUID, BIOS settings, SAN boot parameters, and PXE boot parameters) and a server's external identity (MACs, WWNs, VLAN assignments, and SAN fabric assignments). Thus, one or a plurality of servers in a given enclosure of rack 130 along with a coupled virtual connect module(s) may be managed as a "virtual connect domain." Within the domain, any server may access any LAN or SAN coupled to a VC module. With this configuration, a server profile may be deployed to any server in a virtual connect domain without changing external LAN or SAN configurations.

A virtual connect domain may include a global set of configuration attributes that are applied to all virtual connect devices as a set. This may include, for example, Ethernet configuration settings such as Internet Group Multicast Protocol (IGMP) snooping, loop prevention, fast MAC cache failover, port monitoring, and SNMP configuration.

In an example, a virtual connect logical interconnect may describe the available networks, uplink sets, and stacking links for virtual connect devices in a virtual connect domain. A virtual connect logical interconnect may be managed via second management platform 134.

Computing system 120 may represent any type of computing device capable of reading machine-executable instructions. Examples of the computing device may include, without limitation, a server, a desktop computer, a notebook computer, a tablet computer, a thin client, a mobile device, a personal digital assistant (PDA), a phablet, and the like. Computing system 120 may be in communication with the information technology infrastructure 102, for example, via a computer network. Such a computer network may be similar to the network fabric described above. In an example, computing system 120 may be a part of the information technology infrastructure 102. For example, computing system may part of first management platform 132 or second management platform 134.

In an example, configuration items 116 and 118 may each communicate with configuration items 110, 112, and 114 via a suitable interface or protocol such as, but not limited to, Fibre Channel, Fibre Connection (FICON), and Ethernet.

In an example, computing system 120 may include an identification engine 160, a policy engine 162, a configuration engine 164, a storage engine 166, and an access engine 168.

Engines 160, 162, 164, 166, and 168 may include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of computing system 120. In some examples, the at least one machine-readable storage medium may store instructions that, when executed by the at least one processing resource, at least partially implement some or all engines of the device 106. In such examples, computing system 120 may include the at least one machine-readable storage medium storing the instructions and the at least one processing resource to execute the instructions.

Identification engine 160 may identify a configuration item (for example, 116) coupled to a network fabric (for example, 140). In an example, the configuration item may include a virtual connect device. In an example, the configuration item may be coupled to an edge device of a network. As used herein, an "edge device" may refer to a device that provides an entry point into a core network. Examples of an edge device may include a router, a network switch, and an integrated access device (IADs). In an example, an edge device may include a leaf device (for example, 112) in a network fabric (for example, 140). In an example, the configuration item may be managed via a management platform (for example, second management platform 134). Second management platform 134 may be used, for example, for provisioning, configuring, and deprovisioning the configuration item. In an example, network fabric 140 may be managed via a first management platform 132. First management platform 132 may be used, for example, for provisioning, configuring, and deprovisioning a configuration item (for example, 110) in network fabric 140.

In response to identification of the configuration item by identification engine 160, policy engine 162 may identify a policy associated with the CI. As mentioned earlier, second management platform 134 may store a policy (or policies) for a CI under its management. Policy engine 162 may identify a policy associated with the CI from second management platform 134. In an example, policy engine 162 may identify a link aggregation policy for the CI (for example, a server). The link aggregation policy, for example, may define configuration parameters related to Link Aggregation Control Protocol (LACP).

In response to identification of policy by policy engine, configuration engine 164 may determine configuration information related to the policy from the second management platform. In an example, configuration information for implementing a policy may be stored on second management platform. Referring to the earlier example, configuration engine may determine configuration parameters for the link aggregation policy (for example, related to Link Aggregation Control Protocol (LACP)) from second management platform.

In response to determination of the configuration information by configuration engine 164, storage engine 166 may store the policy, the configuration information related to the policy, and information related to the CI. In an example, storage engine 166 may store the policy, the configuration information related to the policy, and information related to the CI, on computing system 120. In an example, storage engine 166 may store the policy, the configuration information related to the policy, and information related to the CI, on a separate storage device (not depicted in FIG. 1). In an example, storage engine 166 may store the policy, the configuration information related to the policy, and information related to the CI, in a table (for example, a policy table).

Access engine 168 may share the policy, the configuration information related to the policy, and/or information related to the CI, with first management platform 132. As mentioned earlier, first management platform 132 may be used, for example, for provisioning, configuring, and deprovisioning a configuration item (for example, 110) constituting the network fabric. Access engine 168 may allow first management platform to access the policy, the configuration information related to the policy, and/or information related to CI. In an example, the access may allow first management platform 132 to be used for defining a policy and/or configuration information for a configuration item managed via first management platform 132. For example, first management platform 132 may use the policy, the configuration information related to the policy, and/or information related to the CI to define a policy and/or configuration information, for example, for a networking switch. Referring to the earlier example, first management platform 132 may determine configuration parameters of the link aggregation policy (for example, related to Link Aggregation Control Protocol (LACP)) for a leaf switch (for example, 112) under its management.

In an example, first management platform 132 may use the policy, the configuration information related to the policy, and/or information related to the CI to define a corresponding policy and/or corresponding configuration information, for example, for a configuration item under its management. In an example, in response to the configuration performed via first management platform 132, an end-to-end connectivity across two distinct configuration items (for example, a server and a networking switch) that are under the management of two distinct management platforms (for example, first management platform and second management platform) may be established.

Figure 2:
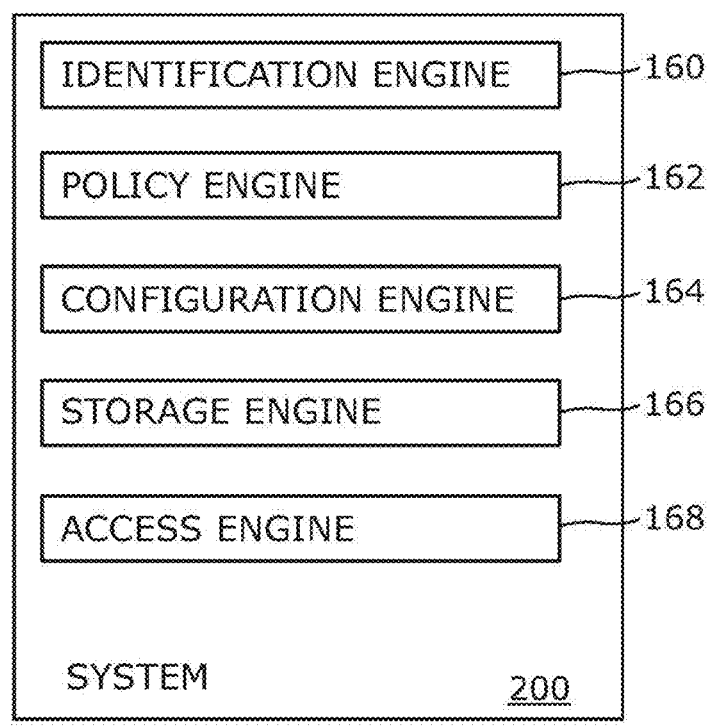
FIG. 2 is a block diagram of an example system for sharing policy and configuration information related to a configuration item.

FIG. 2 is a block diagram of an example system 200 for sharing policy and configuration information related to a configuration item. In an example, system 200 may be implemented by any suitable device, as described herein in relation to computing system 120 of FIG. 1, for example.

In an example, system 200 may include an identification engine 160, a policy engine 162, a configuration engine 164, a storage engine 166, and an access engine 168. In an example, identification engine 160 may identify a configuration item (for example, 116) at an edge of a network fabric (for example, 140) managed via a first management platform 132. In an example, the configuration item may be managed via a second management platform 134. In response to the identification, policy engine 162 may determine a policy associated with the CI from second management platform 134. In response to the determination, configuration engine 164 may determine configuration information related to the policy from second management platform 134. Storage engine 166 may store the policy and the configuration information related to the policy. Access engine 168 may share the policy and the configuration information related to the policy with first management platform 132, wherein the policy and the configuration information related to the policy may be useable to define a policy and configuration information for a configuration item managed via first management platform 132.

Figure 3:
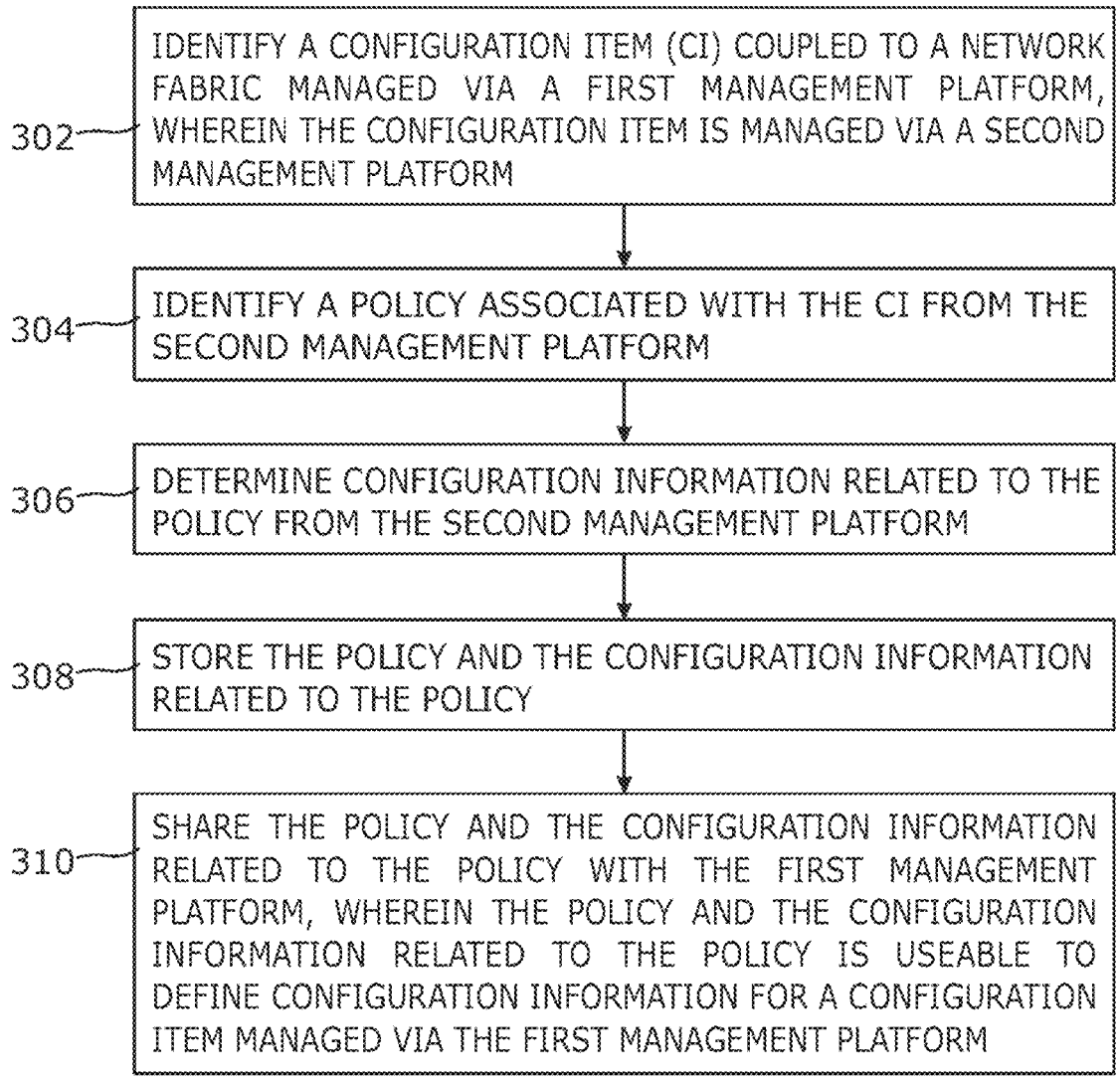
FIG. 3 is a block diagram of an example method of for sharing policy and configuration information related to a configuration item.

FIG. 3 is a block diagram of an example method 300 of sharing policy and configuration information related to a configuration item. The method 300, which is described below, may be partially executed on a system such as computing system 120 of FIG. 1, or system 200 of FIG. 2. However, other suitable computing devices may execute method 300 as well. At block 302, a configuration item coupled to a network fabric that is managed via a first management platform may be identified. The configuration item may be managed via a second management platform. In an example, the configuration item may include a virtual connect device coupled to a server.

At block 304, a policy associated with the CI may be determined from second management platform. Referring to the earlier example, the policy may include a connection policy to connect the server coupled to the virtual connect device with a data center network.

Further to the determination, at block 306, configuration information related to the policy may be determined from second management platform. Referring to the earlier example, the configuration information related to the policy may include determining a logical interconnect from second management platform. A logical interconnect may comprise configuration information related to the virtual connect device, which may include, for example, uplink sets, which connect to a data center network; downlink ports, which connect through the enclosure midplane to the servers in an enclosure; and stacking links, which connect virtual connect devices in an enclosure.

At block 308, the policy, the configuration information related to the policy, and information related to the CI may be stored. Referring to the earlier example, information related to the virtual connect device, the connection policy, and the configuration information (as determined above) related to the connection policy may be stored (for example, on computing system 120).

At block 310, the policy and the configuration information related to the policy may be shared with first management platform. The policy and the configuration information related to the policy may be useable to define configuration information for a configuration item managed via first management platform. Referring to the earlier example, the connection policy and the configuration information related to the connection policy may be useable to define configuration information for a network switching device managed via first management platform.

Figure 4:
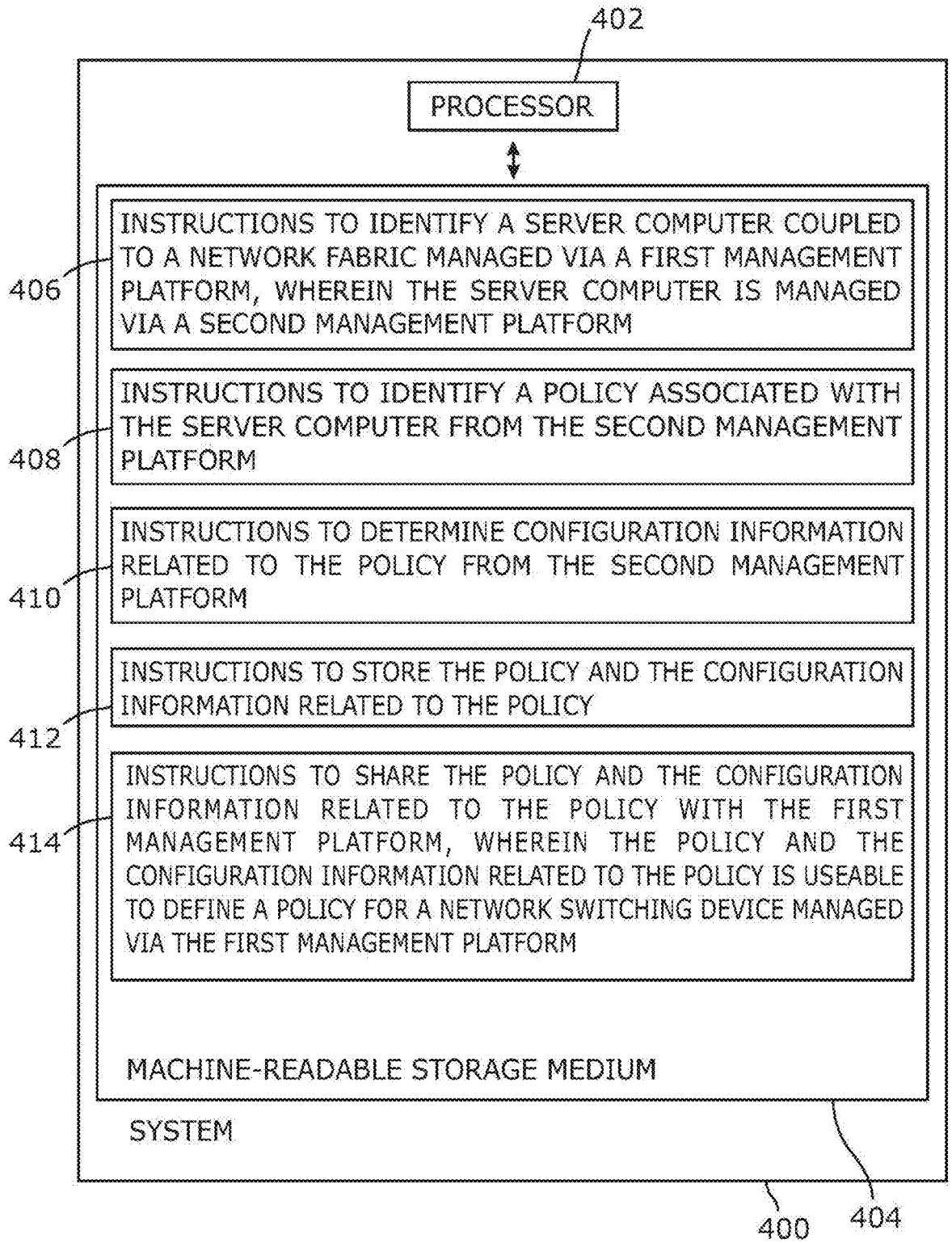
FIG. 4 is a block diagram of an example system including instructions in a machine-readable storage medium for sharing policy and configuration information related to a configuration item.

FIG. 4 is a block diagram of an example system 400 including instructions in a machine-readable storage medium for sharing policy and configuration information related to a configuration item. System 400 includes a processor 402 and a machine-readable storage medium 404 communicatively coupled through a system bus. In an example, system 400 may be analogous to computing system 120 of FIG. 1, or system 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 404 may store instructions 406, 408, 410, 412, and 414. In an example, instructions 406 may be executed by processor 402 to identify a server computer coupled to a network fabric managed via a first management platform, wherein the server computer is managed via a second management platform. Instructions 408 may be executed by processor 402 to determine a policy associated with the server computer from the second management platform. Instructions 410 may be executed by processor 402 to determine configuration information related to the policy from the second management platform. Instructions 412 may be executed by processor 402 to store the policy and the configuration information related to the policy. Instructions 414 may be executed by processor 402 to share the policy and the configuration information related to the policy with the first management platform, wherein the policy and the configuration information related to the policy is useable to define a policy for a network switching device managed via the first management platform.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
by one or more processors:
identifying a configuration item (CI) coupled to a network fabric managed via a first management platform, wherein the CI comprises a hardware infrastructure component managed via a second management platform;
identifying a policy associated with the CI from the second management platform, wherein the policy comprises a connection policy to couple the CI to the network fabric via a virtual connect device;
determining configuration information related to the policy from the second management platform, wherein the configuration information comprises interconnect information related to connecting the CI to the network fabric, and wherein the configuration information comprises information related to downlink ports to couple the CI to an enclosure midplane;
storing the policy and the configuration information related to the policy; and
sharing the policy and the configuration information related to the policy with the first management platform, wherein the policy and the configuration information related to the policy is useable by the first management platform to define a policy and configuration information for a network switching device managed via the first management platform.

2. The method of claim 1, wherein the configuration information for the network switching device managed via the first management platform is included in the policy defined for the network switching device managed via the first management platform.

3. The method of claim 1, wherein the CI coupled to the network fabric is identified from the second management platform.

4. A system comprising:
one or more processors; and
a non-transitory machine-readable medium storing instructions that, when executed, cause the one or more processors to:
identify a configuration item (CI) at an edge of a network fabric managed via a first management platform, wherein the CI comprises a hardware infrastructure component managed via a second management platform;
determine a policy associated with the CI from the second management platform, wherein the policy comprises a connection policy to couple the CI to the network fabric via a virtual connect device;
determine configuration information related to the policy from the second management platform, wherein the configuration information comprises interconnect information related to connecting the CI to the network fabric, and wherein the configuration information comprises information related to downlink ports to couple the CI to an enclosure midplane;
store the policy and the configuration information related to the policy; and
allow access to the policy and the configuration information related to the policy to the first management platform, wherein the policy and the configuration information is useable by the first management platform to define a policy and configuration information for a network switching device managed via the first management platform.

5. The system of claim 4, wherein the CI managed via the second management platform includes the virtual connect device.

6. The system of claim 5, wherein the policy associated with the CI includes a link aggregation policy.

7. The system of claim 4, wherein the first management platform includes a Software Defined Network (SDN) controller.

8. The system of claim 4, wherein the first management platform includes an Application Centric Infrastructure (ACI) controller.

9. The system of claim 4, wherein the configuration information related to the policy from the second management platform comprises information related to uplink sets to couple the CI to a data network.

10. The system of claim 4, wherein the virtual connect device comprises an Ethernet engine.

11. A non-transitory machine-readable storage medium comprising instructions that are executable by a system comprising a processor to:
identify a server computer coupled to a network fabric managed via a first management platform, wherein the server computer is managed via a second management platform;
determine a policy associated with the server computer from the second management platform, wherein the policy comprises a connection policy to couple the server computer to the network fabric via a virtual connect device;
determine configuration information related to the policy from the second management platform, wherein the configuration information comprises interconnect information related to connecting the server computer to the network fabric, and wherein the configuration information comprises information related to downlink ports to couple the server computer to an enclosure midplane;
store the policy and the configuration information related to the policy; and
share the policy and the configuration information related to the policy with the first management platform, wherein the policy and the configuration information related to the policy is useable by the first management platform to define a policy and configuration information for a network switching device managed via the first management platform.

12. The non-transitory machine-readable storage medium of claim 11, wherein the policy for the network switching device corresponds to the policy associated with the server computer.

13. The non-transitory machine-readable storage medium of claim 11, wherein the network fabric includes an Application Centric Infrastructure (ACI).

14. The non-transitory machine-readable storage medium of claim 11, wherein the network fabric includes a Software Defined Network (SDN).

15. The non-transitory machine-readable storage medium of claim 11, wherein the instructions are executable by the system to store, in a table, the policy associated with the server computer and the configuration information related to the policy associated with the server computer.

16. The non-transitory machine-readable storage medium of claim 11, wherein the virtual connect device comprises a Fibre Channel engine.

* * * * *